July 20, 1926.

H. RIESELER 1,593,473

FLUID CHANGE SPEED GEAR

Filed August 27, 1924      2 Sheets-Sheet 1

Inventor,
Hermann Rieseler
By Henry Orth Jr
att

Patented July 20, 1926.

1,593,473

UNITED STATES PATENT OFFICE.

HERMANN RIESELER, OF HAMBURG, GERMANY.

FLUID CHANGE-SPEED GEAR.

Application filed August 27, 1924, Serial No. 734,490, and in Germany August 29, 1923.

The present invention relates to hydraulic change speed mechanisms in which the driving centrifugal pump and the driven turbine are mounted so as to be capable of relative axial movement.

Change speed mechanisms of this type are known wherein the return flow of the driving fluid from the outlet of the driven turbine back to the pump is effected without careful control of the return flow and with inefficient, inconstant cross section of the return passage. Apart from other sources of loss considerable losses are produced in such mechanisms by reason of the uneconomical conversion of the velocity of the fluid into pressure, by liquid impulses, by the formation of eddies and by the dynamic axial thrust on the driving centrifugal pump.

In hydraulic power transmission mechanisms in which the driving centrifugal pump and the driven turbine are adapted for relative axial displacement it is necessary for attaining an efficient passage of the liquid without reducing the hydraulic head of the pump, to close the path of circulation between the discharge side of the driven turbine and the inlet side of the driven pump or primary turbine by means of other members. These new members must not prevent movement of the pump and in addition they must permit of a smooth passage of liquid which is practically free from losses, from the driven turbine to the primary turbine or pump.

The solution of this problem forms the subject matter of the present invention.

For this purpose an oppositely directed curved member and a guide blade rim, rotating with the pump, are arranged in front of the axially displaceable driving centrifugal pump, while the remaining circulating path is formed in the known manner by the driven blade rims with the corresponding guide blade rims.

The oppositely directed curved suction member serves for conducting the driving liquid from the driven blade wheel into the pump. This member does not prevent axial displacement of the pump as it has the same external diameter as the pump with which it rotates.

The surface friction in the curved member tends to produce a deleterious rotation component in the liquid which, at a particular moment, is in the curved member.

For preventing such a rotation component, which would reduce the pump pressure, the guide blade rim, above referred to, is arranged ahead of the pump and rotates therewith. This guide blade rim serves for conducting the fluid, does not absorb any torque and therefore does not take part in the actual transmission of power.

The guide blade rim rotating with the pump, the curved directing member and the primary driving turbine (driving centrifugal pump) form a unitary rotary and axially movable part and substantially one half of the circulating path for the liquid. The other part of the circulating path is formed by the driven blade rims and the associated guide blade rims of a secondary turbine. In this manner a liquid circulation entirely favorable for an efficient transmission of power is provided at every position of the driving pump. The half of the circulating path rotating with the driving shaft may be accurately positioned with respect to any one of the various halves of the circulation path in the driven part of the mechanism.

The transmission of the reaction torques of the driven turbines to the stationary parts of the mechanism is effected by guide blade rims, adapted to be brought into and out of operation and are disposed between the driven blade rims of two-stage or multistage turbines. These guide blade rims are revolubly mounted.

The assembling of the secondary blade rim groups can be effected in any suitable manner. For example there may be provided a reversing stage and one or more forward driving stages. The invention is also applicable to hydraulic power transmission mechanism wherein the driving shaft is coupled directly to the driven shaft, when the driving centrifugal pump is moved beyond the last group of secondary blade rims.

In the drawing is shown by way of example a hydraulic power transmission mechanism embodying my invention provided with a reversing stage, an idle stage, two turbine forward stages for different transmission ratios, and a so-called direct drive, when the turbines run idle.

Figure 1:
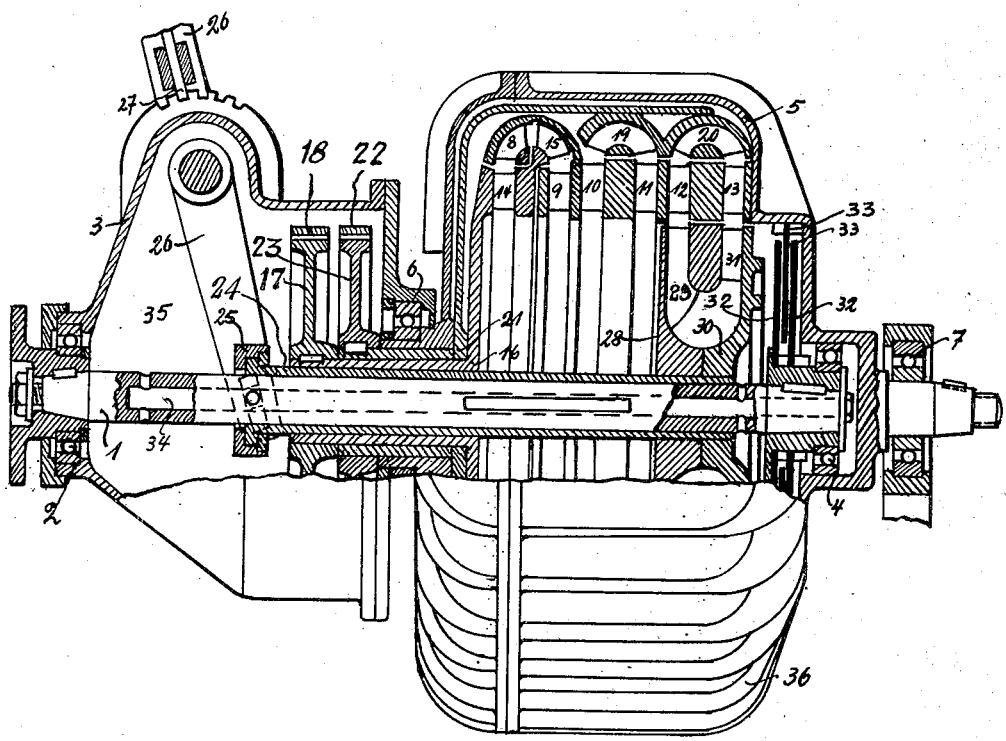
Figure 1 is a longitudinal section partly in elevation of a transmission embodying my invention.

The driving shaft 1 is mounted at the front in a ball bearing 2 disposed in a stationary casing portion 3 and at the rear end in a ball bearing 4 in the driven casing part 5. The casing 5 is mounted in ball bearings 6 and 7. The driven blade rims 8 and 9 for reversing, 10 and 11 for first forward speed, and 12 and 13 for second forward speed are rigidly connected to the driven casing part 5. For absorbing the reaction torque of the reversing turbine there are provided guide blade rims 14 and 15 which are rigidly connected to their hollow shaft 16 and their brake disc 17. The brake disc 17 is held by brake band 18 when reversing turbine is in operation. The brake disc 17, the hollow shaft 16 and the guide blade rims 14 and 15 may however rotate freely when the reversing turbine is not in operation.

The reaction torque of the forward driving turbines is transmitted by the guide blade rim 19 for the first forward speed or 20 for the second forward speed, by the hollow shaft 21 and the brake disc 23 to the stationary casing part 3 when the brake band 22 is tightened. This is the case when either of the two turbines for forward speeds is in operation. When the reversing stage is in operation the brake band 22 is released and the guide blade rims 19 and 20 rotate freely.

The hollow shaft 24 carrying the pump is axially movable on the driving shaft 1 by reason of a groove and feather connection. At its front end the hollow shaft 24 is provided with a sleeve 25, which does not rotate therewith and which is operated by an operating lever 26. This lever 26 cooperates with a notched segment 27 and is adapted to be adjusted in the known manner for the various operating positions of the mechanism. To the hollow shaft 24 is secured a hub which carries the pump blade rim 29. Ahead of the pump blade rim 29 is disposed a curved member 30 and the guide blade rim 31 which also rotates with the pump.

Figure 2:
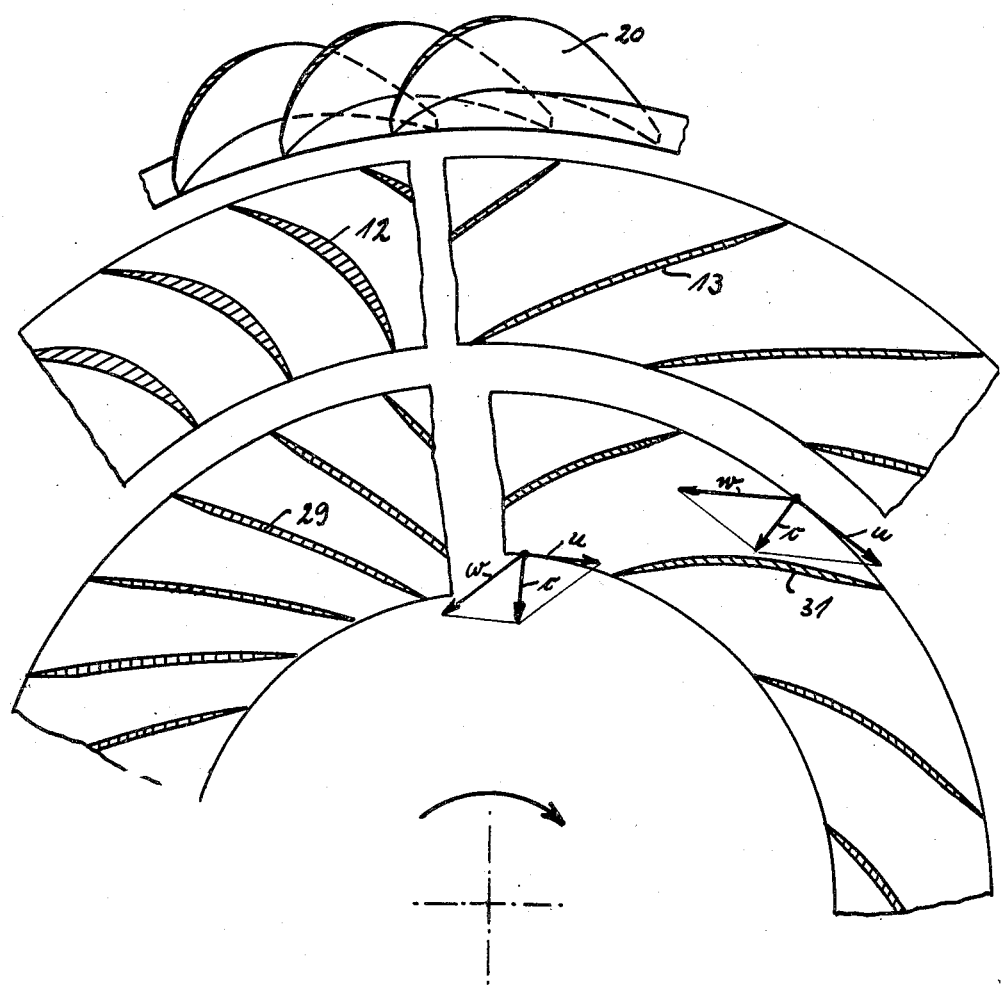
Fig. 2 is a view showing cross sections of certain blades of the pump turbine.

From Figure 2 will be seen the relative shapes of the blades 29, 31, 12, 13 and 20, all of which blades may be included in a single circuit of the driving fluid.

The vector diagrams indicate the velocities at the inlet and exit of the blades 31.
$u$=peripheral velocities.
$w$=relative velocities.
$c$=absolute velocities.

It will be understood that the shapes herein shown are illustrative, and applicant does not restrict himself to the absolute outlines here shown.

In the mechanism as shown in the drawing the idle stage is attained in the known manner by moving the pump blade 29 into a position between 14 and 9 or between 10 and 11 when the pump outlet will be closed.

The direct connection with the driving shaft 1 of the driven part 5 is effected in the arrangement shown in the drawing by pressing the curved member 31 against the laminated discs 32 and 33 in the end position of the hollow shaft 24.

It will be noted that the turbines each have two sets of driving blades in series, that is to say, the turbines are multi-staged.

I claim:—

1. In a hydraulic transmission mechanism, having a plurality of turbines and a centrifugal driving pump, said turbines and pump being relatively shiftable axially; the improvement which comprises a guide blade rim rotatable with the pump.

2. In a hydraulic transmission mechanism, having a plurality of turbines and a centrifugal driving pump, said pump and turbines being relatively shiftable, axially; the improvement which comprises a guide blade rim arranged ahead of the pump and moving in unison therewith said rim receiving liquid discharged from a turbine and delivering it to the pump in any operating position of the pump.

3. In a hydraulic transmission mechanism the combination with a pump, a turbine arranged to be driven thereby, said turbine having associated turbine guide blade rims, of a pump guide blade rim ahead of the pump and movable in unison therewith, said pump and its guide blade rim forming a substantially closed circulating path for liquid with the turbine and its associated guide blade rims.

4. In a hydraulic transmission mechanism, the combination with a pump, turbines arranged to be driven thereby, said pump and turbines arranged to be relatively and axially shiftable, said turbines each having an associated turbine guide blade structure; of a pump guide blade rim arranged ahead of the pump and movable in unison therewith, the pump and pump guide blade rim and a turbine and its guide blade structure with which the pump is for the time being associated forming a substantially closed circulating path for the liquid.

5. In a hydraulic power transmission mechanism, a driving shaft, a hollow shaft slidable but not rotatable thereon, a centrifugal pump on said hollow shaft, a guide blade rim for said pump, said hollow shaft, pump and rim axially movable as a unit on the driving shaft, and a plurality of turbines with any of which said pump and rim may cooperate.

In testimony that I claim the foregoing as my invention, I have signed my name.

HERMANN RIESELER.